UNITED STATES PATENT OFFICE.

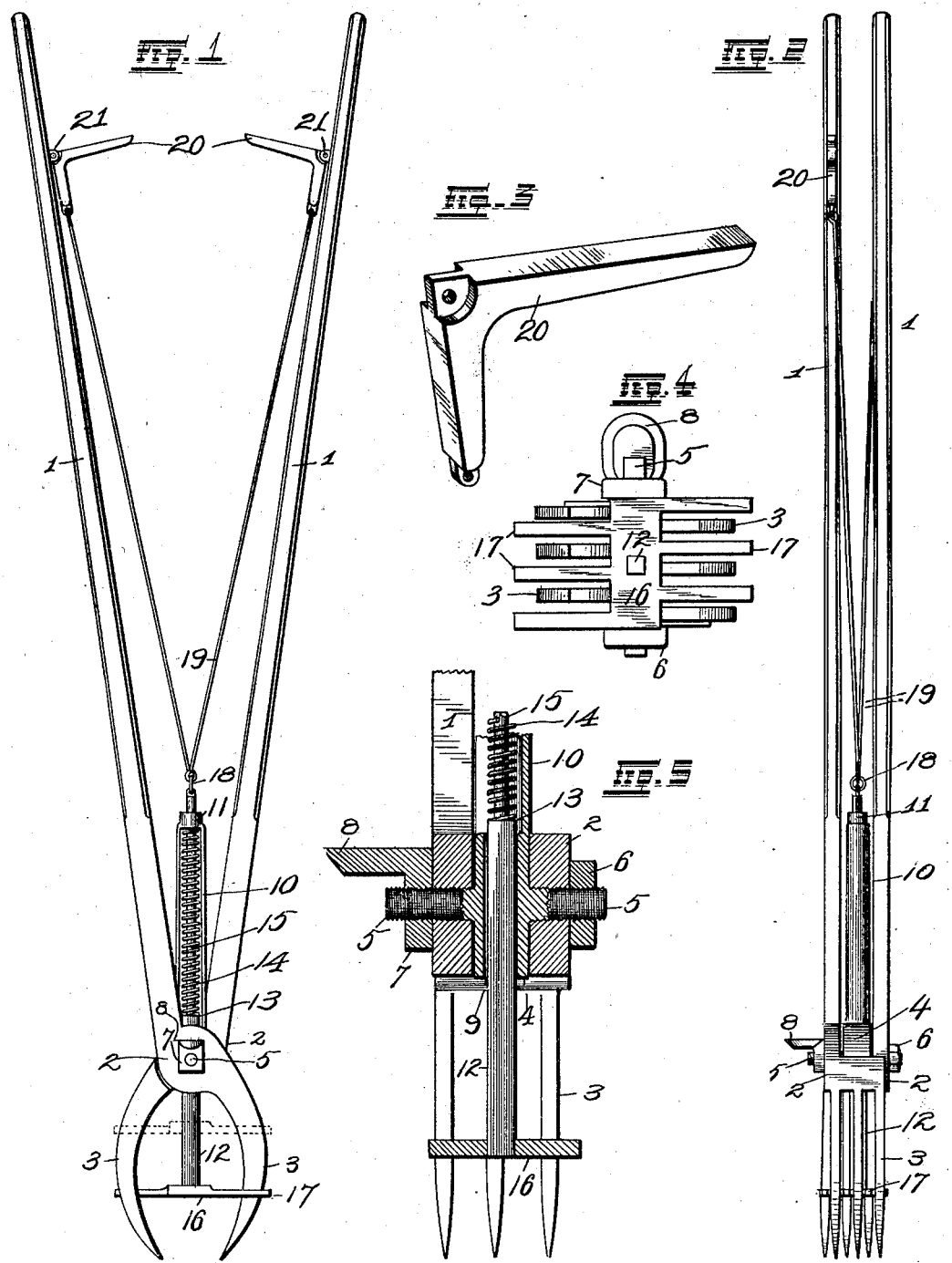

EDWARD D. C. KOETH, OF TIPTON, MISSOURI.

WEED-PULLER.

SPECIFICATION forming part of Letters Patent No. 669,841, dated March 12, 1901.

Application filed June 18, 1900. Serial No. 20,746. (No model.)

*To all whom it may concern:*

Be it known that I, EDWARD D. C. KOETH, of the city of Tipton, Moniteau county, State of Missouri, have invented certain new and useful Improvements in Weed-Pullers, of which the following is a full, clear, and exact description, reference being had to the accompanying drawings, forming a part hereof.

This invention relates to weed-pullers; and it consists of the novel construction, combination, and arrangement of parts hereinafter shown, described, and claimed.

Figure 1 is a front view of my improved weed-puller. Fig. 2 is a side elevation. Fig. 3 is a view in perspective, showing the bell-crank lever made use of in carrying out the invention. Fig. 4 is an end view of the weed-puller, and Fig. 5 is a sectional view showing the manner in which the different parts are secured together.

Referring to the drawings, 1 indicates the handles, which are identical in construction and which are provided on their lower extremities with jaws 2, projecting downwardly from which are the suitably-curved prongs 3. Between the jaws 2 is a casting 4, integral with the sides of which are the threaded projections 5, which project through suitable apertures in the jaws 2. Upon one of the projections 5 is threaded a nut 6, of ordinary construction, and upon the other of said projections is threaded a nut 7, which is provided with an integral horizontal projection 8, which serves as a footpiece in forcing the prongs 3 into the ground.

Extending vertically through the casting 4 is an aperture 9, and integral with the upper side of the casting 4 is a trough-shaped projection 10, provided on its upper end with an integral ring 11. Operating through the aperture 9 is a square rod 12, having a shoulder 13, against which the lower end of a coil-spring 14 rests, the said coil-spring being mounted around the round upper portion 15, integral with the rod 12. Rigidly carried by the lower end of the rod 12 is a casting 16, having a plurality of projections 17, which projections operate between the prongs 3 and on the outer sides thereof. These projections are for the purpose of removing the weed from the device after it has been pulled.

As shown, the upper end of the portion 15 of the rod 12 projects upwardly through the ring 11, and carried by the upper end of the said rod is an ordinary lap-ring 18, connected to which are the operating-rods 19. The upper ends of the rods 19 are connected to the bell-cranks 20, which are pivoted between the ears 21, rigidly carried by the upper ends of the handles 1. By this arrangement by operating the bell-cranks 20 the rods 19 are drawn upwardly, which will compress the spring 14, thereby drawing up the casting 16 and the projection 17, allowing the prongs 3 to be pressed into the ground.

When it is desired to use the device, the handles 1 are drawn outwardly from each other, the casting 16 and the projection 17 are elevated in the manner described, and the prongs 3 are forced into the earth around the roots of the weed which is to be pulled. The upper ends of the handles 1 are then pressed inwardly toward each other, which draws the prongs 3 closely around the roots of the plant, after which the device is raised, thereby drawing the plant from the ground. After removing the plant the bell-cranks 20 are released, which allows the spring 14 to again expand, thereby forcing downwardly the casting 16, which removes the plant and the dirt supported thereby from the prongs 3.

While it has been found desirable on most occasions to make use of the ejecting device, this may be omitted, and I do not desire to limit myself entirely to a device in which the ejector is made use of.

I claim—

1. A device of the class described, comprising a pair of handles pivoted together, a plurality of prongs carried by each of said handles, an ejector operating between the said prongs, handles for raising the said ejector, and means whereby the said ejector is automatically operated, substantially as specified.

2. A weed-puller, comprising suitable operating-handles pivotally secured together, a plurality of prongs carried by each of said handles, an ejector having arms integral therewith for operating between said prongs, a spring for actuating said ejector downwardly, and means for drawing said ejector upwardly when it is desired to use the device, substantially as specified.

3. A weed-puller, comprising suitable operating-handles, prongs carried by said handles, a casting carried between the said handles, and having an aperture; a rod operating within the aperture in said casting, an ejector carried upon said rod, a spring for actuating said rod downwardly, rods connected to the upper end of the said rod, and bell-cranks for drawing the said rods upwardly, substantially as specified.

In testimony whereof I affix my signature in presence of two witnesses.

EDWARD D. C. KOETH.

Witnesses:
J. S. STINGER,
W. F. QUIGLEY.